US009838070B1

(12) United States Patent
Liang et al.

(10) Patent No.: US 9,838,070 B1
(45) Date of Patent: Dec. 5, 2017

(54) PERMUTATION GROUP-BASED CHANNEL RENDEZVOUS METHOD FOR MULTI-ANTENNA COGNITIVE RADIO NETWORK

(71) Applicant: SHENYANG INSTITUTE OF AUTOMATION, CHINESE ACADEMY OF SCIENCES, Liaoning (CN)

(72) Inventors: Wei Liang, Liaoning (CN); Haibin Yu, Liaoning (CN); Bo Yang, Liaoning (CN); Xiaoling Zhang, Liaoning (CN)

(73) Assignee: SHENYANG INSTITUTE OF AUTOMATION, CHINESE ACADEMY OF SCIENCES, Shenyang, Liaoning (CN)

( * ) Notice: Subject to any disclaimer, the term of this patent is extended or adjusted under 35 U.S.C. 154(b) by 0 days.

(21) Appl. No.: 15/527,955

(22) PCT Filed: Dec. 22, 2014

(86) PCT No.: PCT/CN2014/094499
§ 371 (c)(1),
(2) Date: May 18, 2017

(87) PCT Pub. No.: WO2016/082265
PCT Pub. Date: Jun. 2, 2016

(30) Foreign Application Priority Data

Nov. 30, 2014 (CN) .......................... 2014 1 0719074

(51) Int. Cl.
*H04B 1/713* (2011.01)
*H04W 72/12* (2009.01)
(Continued)

(52) U.S. Cl.
CPC ............ *H04B 1/713* (2013.01); *H04W 72/12* (2013.01); *H04B 1/405* (2013.01); *H04B 2001/1045* (2013.01); *H04W 72/0426* (2013.01)

(58) Field of Classification Search
CPC .................... H04B 1/713; H04B 1/405; H04B 2001/1045; H04W 72/12
See application file for complete search history.

(56) References Cited

U.S. PATENT DOCUMENTS

2017/0222721 A1* 8/2017 Dailey ................. H04B 10/116

FOREIGN PATENT DOCUMENTS

| CN | 101588213 A | 11/2009 |
| CN | 103297982 A | 9/2013 |

(Continued)

OTHER PUBLICATIONS

International Search Report dated Jul. 22, 2015 for PCT/CN2014/094499 (4 pages—Chinese with English machine translation).

*Primary Examiner* — Jaison Joseph
(74) *Attorney, Agent, or Firm* — Smith, Gambrell & Russell, LLP

(57) ABSTRACT

The present invention relates to wireless network technology and presents a permutation group-based channel rendezvous method for a multi-antenna cognitive radio network, allowing a cognitive user equipped with multiple antennas to achieve blind channel rendezvous without the need for clock synchronisation. The present invention defines channel hopping sequences whilst making full use of properties such as channel diversity, the closure nature of permutation groups, and multi-antenna concurrency; based on the permutation groups obtained by rotating a regular polyhedron or a regular polygon around different angles according to different types of axes of symmetry, cyclical splicing is implemented, and different antennas can, according to different (Continued)

rules, independently generate hopping sequences and switching channels; the sequence generating methods are various and flexible; the use of parallel search ensures that deterministic rendezvous with other cognitive users is achieved as quickly as possible and as much as possible in a limited time; and the present method is a highly efficient blind channel rendezvous method having wide applicability and suitable for use in large-scale wireless networks.

4 Claims, 2 Drawing Sheets

(51) Int. Cl.
      *H04W 72/04*    (2009.01)
      *H04B 1/405*    (2015.01)
      *H04B 1/10*    (2006.01)

(56) References Cited

FOREIGN PATENT DOCUMENTS

| | | | |
|---|---|---|---|
| CN | 103391143 A | 11/2013 | |
| CN | 104038944 A | 9/2014 | |

\* cited by examiner

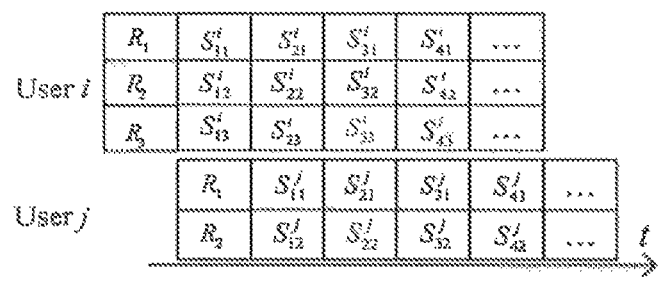
Fig. 1
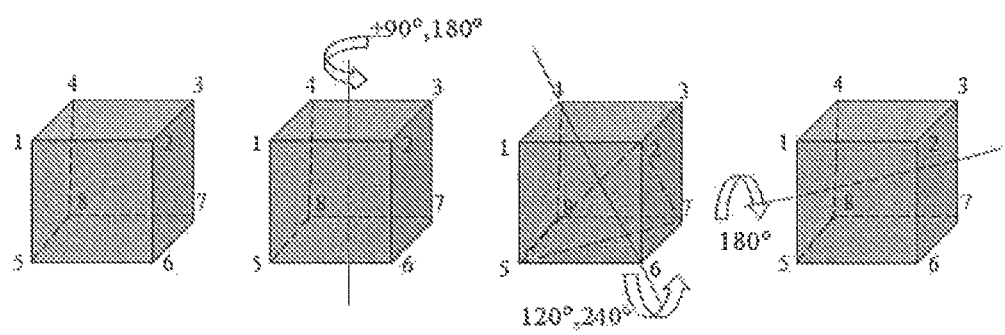
Fig. 2
Fig. 3

PERMUTATION GROUP-BASED CHANNEL RENDEZVOUS METHOD FOR MULTI-ANTENNA COGNITIVE RADIO NETWORK

TECHNICAL FIELD

The present invention relates to a wireless network technology and in particular to a permutation group-based channel rendezvous method for a multi-antenna cognitive radio network.

BACKGROUND

A cognitive radio technology is a promising technology for currently solving the problem of low spectrum utilization rate caused by a static spectrum allocation manner. The utilization rate of a licensed frequency band can be effectively increased in a dynamic spectrum access way. Since a primary user in the cognitive radio network has higher priority for spectrum use than secondary users, the secondary users need to detect the signal of the primary user before using a frequency band and to realize coexistence with the primary user by an underlay or overlay spectrum sharing mechanism, so as to avoid generating interference to the communication of the primary user.

The protocol design for network construction of the cognitive radio network is based on that a sender can find a receiver and can use the same channel to communicate. In view of the problem, a channel rendezvous mechanism provides a common transmission medium for the secondary users so as to establish a communication link. This is a necessary process for completing control instruction interaction and data information transmission, and is a precondition for realizing neighbor discovery, handshake between the sender and the receiver, topology control, routing request broadcast, routing information update and other processes.

According to the dependency on a preset dedicated common control channel in the network, the channel rendezvous strategy can be classified into two categories: the auxiliary channel rendezvous strategy and the blind channel rendezvous strategy. The auxiliary channel rendezvous strategy is based on a dedicated common control channel, inherits the idea of protocol design of a traditional multi-channel wireless network MAC (Medium Access Control), and belongs to a static channel rendezvous strategy. Since the preset dedicated common control channel is a channel rendezvous point known by the secondary users, the process of completing channel rendezvous and establishing the communication link for the secondary users can be simplified. However, the network-wide dedicated common control channel can easily become a bottleneck that limits the network capacity due to an increase of network load. The common control channel is easily influenced by the activity of the primary user. When the primary user appears in the control channel, all the secondary users must terminate communication and switch to other channels, causing a decrease of the throughput of the network. Moreover, when the primary user occupies the control channel for long, the access of the secondary users is blocked. Namely, in the cognitive radio network, the common control channel is not always available. In addition, the dedicated common control channel may bring the problem of single-point failure to the network due to a denial of service attack. The blind channel rendezvous strategy is independent of the dedicated common control channel, is a dynamic on-demand channel rendezvous strategy, and is suitable for the property of dynamic change of the channel availability of the cognitive radio network. Further, the blind channel rendezvous strategy can be classified into a channel rendezvous strategy based on signal processing, a channel rendezvous strategy based on the receiver, a channel rendezvous strategy based on a channel hopping sequence, a grouping/clustering-based channel rendezvous strategy and the like. The excellent channel handover property of a cognitive radio device enables the channel hopping manner to become a current major method for achieving the blind channel rendezvous among the secondary users. The channel rendezvous based on the channel hopping sequence is operated on a time slot system. Each secondary user generates an algorithm according to the sequence so as to construct an independent channel hopping sequence. The sequence determines the channel hopping order of the secondary user. Once the sender and the receiver switch to the same channel through channel hopping, the channel becomes a rendezvous channel. The design of the channel hopping sequence comprises a clock synchronization-dependent synchronous sequence and a clock synchronization-independent asynchronous sequence. Apparently, the latter has wider applicability. The coverage range of the channel hopping method is not network-wide, so as to effectively prevent the users from generating the phenomenon of convergent behaviors. To prevent the rendezvous channel from being congested, all the channels of the network shall be ensured to have an equal opportunity to become the rendezvous channel during design, so as to ensure the fairness that the channels are accessed and used. By spreading the rendezvous channels out over all the channels, the feature of channel diversity of the cognitive radio network can be fully used. However, through the adoption of the method, the secondary users need to frequently switch the channels in order to achieve channel rendezvous, causing a large time consumption. To this end, the key is to design the channel hopping sequence for achieving deterministic rendezvous as soon as possible within a finite time.

At present, the rendezvous strategy based on the channel hopping sequence mainly considers that each secondary user only needs to configure one antenna. This is the most common configuration in most of network devices. However, in such network as the cognitive radio network with multiple channels and dynamic change of the channel availability, the delay consumption of rendezvous search is often great. The processing capability of only one antenna is limited, and becomes the bottleneck that restricts the entire performance. Through the use of a multi-antenna cognitive radio device, each antenna independently hops according to respective channel hopping sequences and the feature of the channel diversity can be effectively used. Rendezvous can be achieved as long as any antenna of the receiver and the sender is hopped to the same channel at the same time slot. This channel hopping method for multi-antenna concurrent processing is an effective way for increasing the search efficiency.

SUMMARY

For the problem that the existing widely used single-antenna channel rendezvous method takes a long time to achieve rendezvous, the present invention proposes a permutation group-based channel rendezvous method for a multi-antenna cognitive radio network. The present invention can accelerate rendezvous only by appropriately increasing the number of antennas, i.e., can rapidly find neighbor users only by increasing a small hardware cost.

A technical solution adopted in the present invention for achieving the above purpose is as follows: a permutation group-based channel rendezvous method for a multi-antenna cognitive radio network is proposed, and different users which need rendezvous in the network at least have one common available channel. The rendezvous process comprises:

Channel numbers are mapped as elements in permutation groups, and channel hopping sequences of different antennas within one period are mapped as sequences of different elements in finite groups;

under the condition that the number of channels in the cognitive radio network is even, the elements in the permutation groups are vertexes of a regular polyhedron and the channel hopping sequences of different antennas are constructed through permutation groups obtained by rotating the regular polyhedron by different angles according to different types and different directions of axes of symmetry;

under the condition that the number of the channels in the cognitive radio network is odd, the elements in the permutation groups are vertexes of a regular polygon and the channel hopping sequences of different antennas are constructed through permutation groups obtained by rotating the regular polygon by different angles according to different types of axes of symmetry and successively sustained left/right cyclical rotation;

through limited time slots, the common available channel appears in the same time slot of the different users to achieve channel rendezvous.

The permutation groups selected by different users correspond to different types of axes of symmetry when constructing the channel hopping sequences.

Under the condition that the number of the channels in the cognitive radio network is even, when the users have a plurality of antennas, the channel hopping sequence of a certain antenna of the same user is cyclical splicing by rotating the corresponding permutation groups by different angles according to the same type and the same direction of axes of symmetry, while the channel hopping sequence of different antennas of the same user is cyclical splicing by rotating the corresponding permutation groups by different angles according to the same type and different directions of axes of symmetry.

Under the condition that the number of the channels in the cognitive radio network is odd, when the users have a plurality of antennas, the channel hopping sequence of a certain antenna of the same user is cyclical splicing by rotating the corresponding permutation groups by different angles according to the same type of axes of symmetry, while the channel hopping sequence of other antennas of the user is cyclical splicing of sequences obtained by successively and continuously rotating the channel hopping sequence of a previous antenna left/right cyclically by one time slot.

The permutation group-based channel rendezvous method for multi-antenna cognitive radio network proposed by the present invention is proposed on the premise of fully considering multi-channel handover features of the cognitive radio network, and the realization of the channel rendezvous process of different users can be accelerated only by increasing a small hardware cost (i.e., antennas), specifically:

1. The permutation group-based channel rendezvous method proposed by the present invention conducts element (i.e., channel number) permutation and cycle of different antennas according to different rules, and repeated elements can be ensured to appear within a limited time, thereby achieving channel rendezvous and effectively shortening channel rendezvous time.

2. The method of the present invention makes full use of the feature of multi-antenna concurrent search and the feature of channel diversity of the cognitive radio network, ensures rapid realization of channel rendezvous, is a key link of network construction and is suitable for use in large-scale wireless networks.

3. The channel rendezvous method proposed in the method of the present invention has generality, is suitable for any number of channels, has no constraint on parity of the number of the channels, and is an effective method suitable for multi-antenna clock asynchronous scenarios.

DESCRIPTION OF THE DRAWINGS

FIG. 1 is a schematic diagram of considered channel hopping sequences generated by different antennas of different users (i and j);

FIG. 2 is a schematic diagram of rotary construction of permutation groups by taking a regular cube as an example;

FIG. 3 is a schematic diagram of construction of channel hopping sequences by permutation groups obtained according to a regular cube;

DETAILED DESCRIPTION

Figures 4, 5:
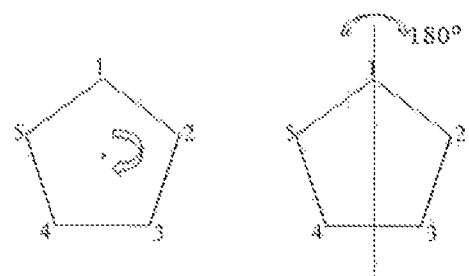
FIG. 4 is a schematic diagram of rotary construction of permutation groups by taking a regular pentagon as an example.
FIG. 5 is a schematic diagram of construction of channel hopping sequences by permutation groups obtained according to a regular pentagon.

The present invention will be further described in details below in combination with the drawings and the embodiments.

A cognitive radio network environment considered in the present invention comprises K (K≥2) users. It is assumed that the network has different time slots and all the time slots have the same fixed length. A licensed frequency band in the cognitive radio network is divided into M (M≥1) orthogonal channel, i.e., $C=\{c_1, c_2, \ldots c_M\}$. All the users in the network are assumed to know the channel numbers. If a secondary user may communicate on a certain channel and may not generate any interference to the activity of a primary user, the channel is considered available for the secondary user. However, whether the channel is available can be known through a currently mature spectrum sensing technology. Without loss of generality, the present invention considers a channel rendezvous problem between a pair of users i and j (i≠j and i, j=1, 2, . . . , K). It is assumed that the user i configures m (m>1) antennas and the user j configures n (n>1) antennas, and m is not equal to n in a heterogeneous cognitive radio network environment. To ensure that deterministic rendezvous is achieved among different users, there must exist at least one common available channel for a successful rendezvous no matter how different the available channel sets are. Since different antennas of the same user independently generate the channel hopping sequences, $Seq_m^i, Seq_n^j$ is used for respectively representing the channel hopping sequences of different antennas of the users i and j, wherein $Seq_{tm}^i$ specifically indicates the channel where the $m_{th}$ antenna of the user i is accessed in the $t_{th}$ time slot, while $Seq_{tn}^j$ specifically indicates the channel where the $n_{th}$ antenna of the user j is accessed in the $t_{th}$ time slot. In view of difficult realization of clock synchronization in the cognitive radio network environment, the present invention considers the more general situation suitable for clock asynchronization. Since rendezvous is considered to be realized as long as any antenna of a receiver and a sender is hopped to the same channel at the same time slot under a multi-antenna configuration, while the same time slot under a clock asynchronization situation means that the time slots between the users are overlapped incompletely, but the time of the overlapped part is enough to complete all necessary steps of achieving rendezvous (such as communication handshake, packet exchange and the like). At this point, the time slots can be considered to be aligned to a certain extent in spite of non-alignment.

The present invention designs channel hopping sequences of different antennas whilst using properties of the permutation groups in the finite groups. Bijection δ on a finite nonempty set M={1, 2, . . . , m} is called a permutation on M, denoted by $$\sigma = \begin{pmatrix} 1 & 2 & \dots & m \\ a_1 & a_2 & \dots & a_m \end{pmatrix}$$

wherein $a_1, \dots a_m$ are not equal to each other. Particularly, identical permutation means $$I = \begin{pmatrix} 1 & 2 & \dots & m \\ 1 & 2 & \dots & m \end{pmatrix}$$

If a nonempty subset G in all the permutations $S_m$ on M satisfies: (1) for all the permutations f and g in G, f and g belong to G, (2) the identical permutation I belongs to G, and (3) for each permutation f in G, an inverse permutation of f, i.e., $f^{-1}$ also belongs to G, then G is a permutation group on M.

In the present invention, the channel numbers in the cognitive radio network are considered as the elements in the permutation groups, the channel hopping sequences of different antennas within one period are considered as sequences of different elements in the finite groups, and the channel hopping sequences are permutated and cycled according to a certain rule. However, permutating and cycling rules of the channel hopping sequences of different antennas are different. For example, one antenna of the user i does not adopt a special rule, but periodic circle is performed on the identical permutation of the channel numbers, while other antennas adopt a certain rule (e.g., rotation according to different directions and angles) to perform permutation and circle. In this way, due to the closure nature of the permutation groups, repetition of the same element may occur within a certain time, namely realization of the deterministic rendezvous within the finite time can be expected among different antennas of different users. The channel hopping sequence of each antenna is generated independently according to a permutation group theory in the finite groups, and rendezvous can be successfully achieved as long as any antenna of the receiver and the sender is hopped to the same channel at the same time slot.

The designed method is described below by taking the permutation groups of a regular cube as an example. A regular cube is taken, which is called a fixed body. A vertex set of the regular cube is {1, 2, . . . , 8} which is also considered as a channel set of C={$c_1, c_2, \dots c_8$} in the cognitive radio network. Another regular cube is devised to completely coincide with the fixed body, has the same vertex marks as the fixed body, and is called as a mobile body. The mobile body makes various rotations around the axis of symmetry of the fixed body, so that the mobile body coincides with the fixed body again. Each rotation determines one permutation on the vertex set. These rotations include the following four different types (becoming the same mode under the effect of the permutation groups is considered as the same permutation):

(i) non-rotation, which corresponds to the identical permutation $\sigma_{T1}$=(1)(2)(3)(4)(5)(6)(7)(8)

(ii) rotation by taking connection lines of centers of opposite surfaces as axes: the axes have three different directions; each axis can rotate by three different angles of 90°, 180° and 270° (i.e., −90°). For example, the permutations corresponding to the axes shown in the left second drawing of FIG. 2 are respectively $\sigma_{T211}$=(1 2 3 4)(5 6 7 8)

$\sigma_{T212}$=(13)(24)(57)(68)

$\sigma_{T213}$=(1 4 3 2)(5 8 7 6)

For another example, the permutation groups corresponding to another axis, which rotates according to different angles, with a different direction are respectively $\sigma_{T221}$=(1 4 8 5)(2 3 7 6)

$\sigma_{T222}$=(18)(45)(27)(36)

$\sigma_{T223}$=(1 5 8 4)(2 6 7 3)

and so on.

(iii) rotation by taking connection lines of two opposite vertexes as axes: the axes have four different directions; each axis can rotate by two different angles of 120° and 240°. For example, the permutations corresponding to the axes shown in the right second drawing of FIG. 2 are respectively $\sigma_{T311}$=(3)(5)(168)(274)

$\sigma_{T312}$=(3)(5)(186)(247)

and so on.

(iv) rotation by taking connection lines of centers of two opposite edges as axes: the axes have six different directions; each axis can rotate by one angle of 180°. For example, the permutations corresponding to the axes shown in the right first drawing of FIG. 2 are respectively $\sigma_{T41}$=(15)(37)(46)(28)

and so on.

According to the permutation groups corresponding to different rotations of different axes of symmetry, when the channel hopping sequences of different antennas of different users in the cognitive radio network are constructed, the following method is adopted in the present invention:

(i) the same user selects the same type of axes of symmetry (e.g., selects a certain type from the above four types $\delta_{T1}$ to $\delta_{T4}$) when constructing the channel hopping sequences, and different users select different types of axes of symmetry when constructing the channel hopping sequences.

(ii) The channel hopping sequence of a certain antenna of the same user is cyclical splicing by rotating the corresponding permutation groups by different angles according to the same type and the same direction of axes of symmetry (for example, the channel hopping sequence of the first antenna of the user i may be $Seq_1^i=\sigma_{T211}+\sigma_{T212}+\sigma_{T213}+\ldots$), while the channel hopping sequence of different antennas of the same user is cyclical splicing by rotating the corresponding permutation groups by different angles according to the same type and different directions of axes of symmetry (for example, the channel hopping sequence of the second antenna of the user i may be $Seq_2^i=\sigma_{T221}+\sigma_{T222}+\sigma_{T223}+\ldots$).

For example, FIG. 3 shows the channel hopping sequences constructed according to the principle. The user 1 configures three antennas (R1, R2 and R3 of the user 1) and selects the above second type of axis of symmetry. The channel hopping sequence of the first antenna of the user is cyclical splicing by rotating the corresponding permutation groups by different angles (i.e., 90°, 180° and 270°) according to a certain direction of axes of symmetry, the channel hopping sequence of the second antenna is cyclical splicing by rotating the corresponding permutation groups by different angles according to another direction of axes of symmetry, and so on. However, the user 2 configures two antennas (R1 and R2 of the user 2) and selects the above third type of axis of symmetry (different from the user 1). The construction method of the channel hopping sequence of each antenna of the user 2 uses the same principle as the user 1, and will not be repeated again. It can be seen from the drawing that, although different users start channel hopping at different time slots (i.e., clock asynchronization), the realization of deterministic rendezvous (i.e., the time slots indicated in the same color in the drawing) can still be ensured within a finite time. It is worth mentioning that rendezvous can be successfully achieved as long as any antenna of different users accesses the same channel at the same time slot. As shown in FIG. 3, the method proposed by the present invention not only can achieve rendezvous among different antennas of the users within a short time, but also can achieve multiple times of rendezvous within one channel hopping period. Namely, the method not only shortens the rendezvous time, but also enhances the rendezvous degree (i.e., the number of rendezvous times).

The implementation process of the method is described above through an example of the permutation groups obtained by rotating the regular cube. To increase the generality of the method of the present invention, the generating patterns of the permutation groups may be varied. For example, in the above example, the channel numbers of the cognitive radio network are mapped as a total of eight vertexes of the regular cube, but not all of the networks have eight channels; the channels can also be represented by six different surfaces of the regular cube; and in this way, the cognitive radio network with six channels can be described. Furthermore, different channels can also be represented by the vertexes or surfaces of a regular tetrahedron, a regular octahedron and the like, while the construction method of the channel hopping sequences is similar to that of the above regular cube except that the types and the directions of the axes of symmetry and the rotatable angles are different.

Although the channel rendezvous performance of the cognitive radio network can be enhanced to a certain extent in a way of constructing the channel hopping sequences through the permutation groups of the regular polyhedron, the way is only suitable for the situation that the number of the channels is even. For the situation that the number of the channels is odd, the regular polyhedron is not suitable for representation. To this end, the present invention further proposes a construction method for the channel hopping sequences based on the permutation groups, which is suitable for the situation that the number of the channels is odd.

The method can be used for acquiring the permutation groups with a planar regular polygon.

Without loss of generality, the construction method of the channel hopping sequences is elaborated below by taking the cognitive radio network with five channels as an example. The permutation groups can be obtained by five channels through a regular pentagon (fixed body). Each vertex represents one channel. As shown in FIG. 4, a vertex set of the regular pentagon is $\{1, 2, \ldots, 5\}$ which is also considered as a channel set of $C=\{c_1, c_2, \ldots c_5\}$ in the cognitive radio network. Another regular pentagon is devised to completely coincide with the fixed body, has the same vertex marks as the fixed body, and is called as a mobile body. The mobile body makes various rotations around the axis of symmetry of the fixed body, so that the mobile body coincides with the fixed body again. Each rotation determines one permutation on the vertex set. These rotations include the following three different types:

(i) non-rotation, which corresponds to the identical permutation $\sigma_{T1}=(1)(2)(3)(4)(5)$ (ii) rotation by taking the center of the regular pentagon as an axis: only one such axis exists and can rotate by four different angles of 72°, 144°, 216° and 288°, and the corresponding permutations are respectively $\sigma_{T21}=(1\ 2\ 3\ 4\ 5)$ $\sigma_{T22}=(1\ 3\ 5\ 2\ 4)$ $\sigma_{T23}=(1\ 4\ 2\ 5\ 3)$ $\sigma_{T24}=(1\ 5\ 4\ 3\ 2)$ (iii) rotation by taking connection lines of the vertexes and midpoints of opposite edges as axes: five such axes exist and can rotate by 180°, and the corresponding permutations are respectively $\sigma_{T31}=(1)(25)(34)$ $\sigma_{T32}=(2)(13)(45)$ $\sigma_{T33}=(3)(15)(24)$ $\sigma_{T34}=(4)(12)(35)$ $\sigma_{T35}=(5)(14)(23)$ According to the permutation groups corresponding to different rotations of different axes of symmetry, when the channel hopping sequences of different antennas of different users in the cognitive radio network are constructed, the following method is adopted in the present invention:

(i) the same user selects the same type of axes of symmetry (e.g., selects a certain type from the above three types $\delta_{T1}$ to $\delta_{T3}$) when constructing the channel hopping sequences, and different users select different types of axes of symmetry when constructing the channel hopping sequences.

(ii) The channel hopping sequence of a certain antenna of the same user is cyclical splicing by rotating the corresponding permutation groups by different angles according to the same type of axes of symmetry (for example, the channel hopping sequence of the first antenna of the user i may be $Seq_1^i=\sigma_{T21}+\sigma_{T21}+\sigma_{T22}+\sigma_{T23}+\sigma_{T24}+\ldots$), while the channel hopping sequence of other antennas of the user is cyclical splicing of sequences obtained by successively rotating the channel hopping sequence of a previous antenna left cyclically by one time slot, i.e., $Seq_2^i=rotate(Seq_1^i,1)$.

For example, FIG. 5 shows the channel hopping sequences constructed according to the principle. The user 1 configures three antennas (R1, R2 and R3 of the user 1) and selects the above second type of axis of symmetry. The channel hopping sequence of the first antenna of the user is cyclical splicing by rotating the corresponding permutation groups by different angles (i.e., 72°, 144°, 216° and 288°) according to this type of axes of symmetry, the channel hopping sequence of the second antenna is obtained by successively rotating a previous antenna (i.e., the first antenna) left cyclically by one time slot, and so on. However, the user 2 configures two antennas (R1 and R2 of the user 2) and selects the above third type of axis of symmetry (different from the user 1). The construction method of the channel hopping sequence of each antenna of the user 2 uses the same principle as the user 1, and will not be repeated again. It can be seen from the drawing that, although different users start channel hopping at different time slots (i.e., clock asynchronization), the realization of deterministic rendezvous (i.e., the time slots indicated in the same color in the drawing) can still be ensured within a finite time. In case of other situations that the number of the channels is odd, the method is similar to die above method except that the types of the axes of symmetry and rotatable angles are different, so the method will not be repeated.

We claim:

1. A permutation group-based channel rendezvous method for a multi-antenna cognitive radio network, wherein different users which need rendezvous in the network at least have one common available channel, and the rendezvous process comprises:

Channel numbers are mapped as elements in permutation groups, and channel hopping sequences of different antennas within one period are mapped as sequences of different elements in finite groups;

under the condition that the number of channels in the cognitive radio network is even, the elements in the permutation groups are vertexes of a regular polyhedron and the channel hopping sequences of different antennas are constructed through permutation groups obtained by rotating the regular polyhedron by different angles according to different types and different directions of axes of symmetry;

under the condition that the number of the channels in the cognitive radio network is odd, the elements in the permutation groups are vertexes of a regular polygon and the channel hopping sequences of different antennas are constructed through permutation groups obtained by rotating the regular polygon by different angles according to different types of axes of symmetry and successively sustained left/right cyclical rotation;

through limited time slots, the common available channel appears in the same time slot of the different users to achieve channel rendezvous.

2. The permutation group-based channel rendezvous method for the multi-antenna cognitive radio network according to claim 1, wherein said different users select the permutation groups corresponding to different types of axes of symmetry when constructing the channel hopping sequences.

3. The permutation group-based channel rendezvous method for the multi-antenna cognitive radio network according to claim 1, wherein under said condition that the number of the channels in the cognitive radio network is even, when the users have a plurality of antennas, the channel hopping sequence of a certain antenna of the same user is cyclical splicing by rotating the corresponding permutation groups by different angles according to the same type and the same direction of axes of symmetry, while the channel hopping sequence of different antennas of the same user is cyclical splicing by rotating the corresponding permutation groups by different angles according to the same type and different directions of axes of symmetry.

4. The permutation group-based channel rendezvous method for the multi-antenna cognitive radio network according to claim 1, wherein under said condition that the number of the channels in the cognitive radio network is odd, when the users have a plurality of antennas, the channel hopping sequence of a certain antenna of the same user is cyclical splicing by rotating the corresponding permutation groups by different angles according to the same type of axes of symmetry, while the channel hopping sequence of other antennas of the user is cyclical splicing of sequences obtained by successively and continuously rotating the channel hopping sequence of a previous antenna left/right cyclically by one time slot.

* * * * *